United States Patent
Döring

(10) Patent No.: US 11,261,955 B2
(45) Date of Patent: Mar. 1, 2022

(54) TRANSMISSION WITH PRETENSIONED TRANSMISSION HOUSING WALLS

(71) Applicant: Flender GmbH, Bocholt (DE)

(72) Inventor: Andreas Döring, Bocholt (DE)

(73) Assignee: FLENDER GMBH, Bocholt (DE)

( * ) Notice: Subject to any disclaimer, the term of this patent is extended or adjusted under 35 U.S.C. 154(b) by 0 days.

(21) Appl. No.: 16/863,324

(22) Filed: Apr. 30, 2020

(65) Prior Publication Data
US 2020/0347927 A1    Nov. 5, 2020

(30) Foreign Application Priority Data

Apr. 30, 2019  (EP) .................................... 19171926

(51) Int. Cl.
*F16H 57/031*  (2012.01)
*F16H 57/021*  (2012.01)

(52) U.S. Cl.
CPC ......... *F16H 57/031* (2013.01); *F16H 57/021* (2013.01)

(58) Field of Classification Search
CPC ................. F16H 57/021; F16H 57/031; F16H 2057/02008
See application file for complete search history.

(56) References Cited

U.S. PATENT DOCUMENTS

| 4,697,675 A | * | 10/1987 | Johnson, III | ............ F16D 41/07 188/82.8 |
| 2010/0120575 A1 | | 5/2010 | Muller | |
| 2015/0007690 A1 | * | 1/2015 | Brunazzi | ................. F16C 35/06 74/606 R |

FOREIGN PATENT DOCUMENTS

| CN | 107882949 A | * | 4/2018 | ............ F16H 55/06 |
| DE | 19728919 A1 | | 1/1999 | |
| DE | 102007006228 A1 | | 8/2008 | |
| EP | 102011115595 A1 | | 4/2013 | |
| EP | 2821658 A1 | | 1/2015 | |

OTHER PUBLICATIONS

European Search Report for European Application No. 19171926.9-1012 dated Oct. 14, 2019.

* cited by examiner

*Primary Examiner* — Thomas C Diaz
(74) *Attorney, Agent, or Firm* — Lempia Summerfield Katz LLC

(57) ABSTRACT

A transmission has a transmission housing. The transmission housing has a first opening formed in a first wall and a second opening formed in a second wall. The transmission includes a shaft that is mounted rotatably on the transmission housing via bearing devices arranged in the first opening and the second opening. The transmission includes respective covers, by which the first opening and the second opening are closed. In addition, the transmission includes screw elements, by which the covers are held on the transmission housing. A coupling element, to which the screw elements are screwed in order to hold the covers on the transmission housing, is provided. As a result of this, the first wall and the second wall are pretensioned in an axial direction of the shaft.

13 Claims, 1 Drawing Sheet

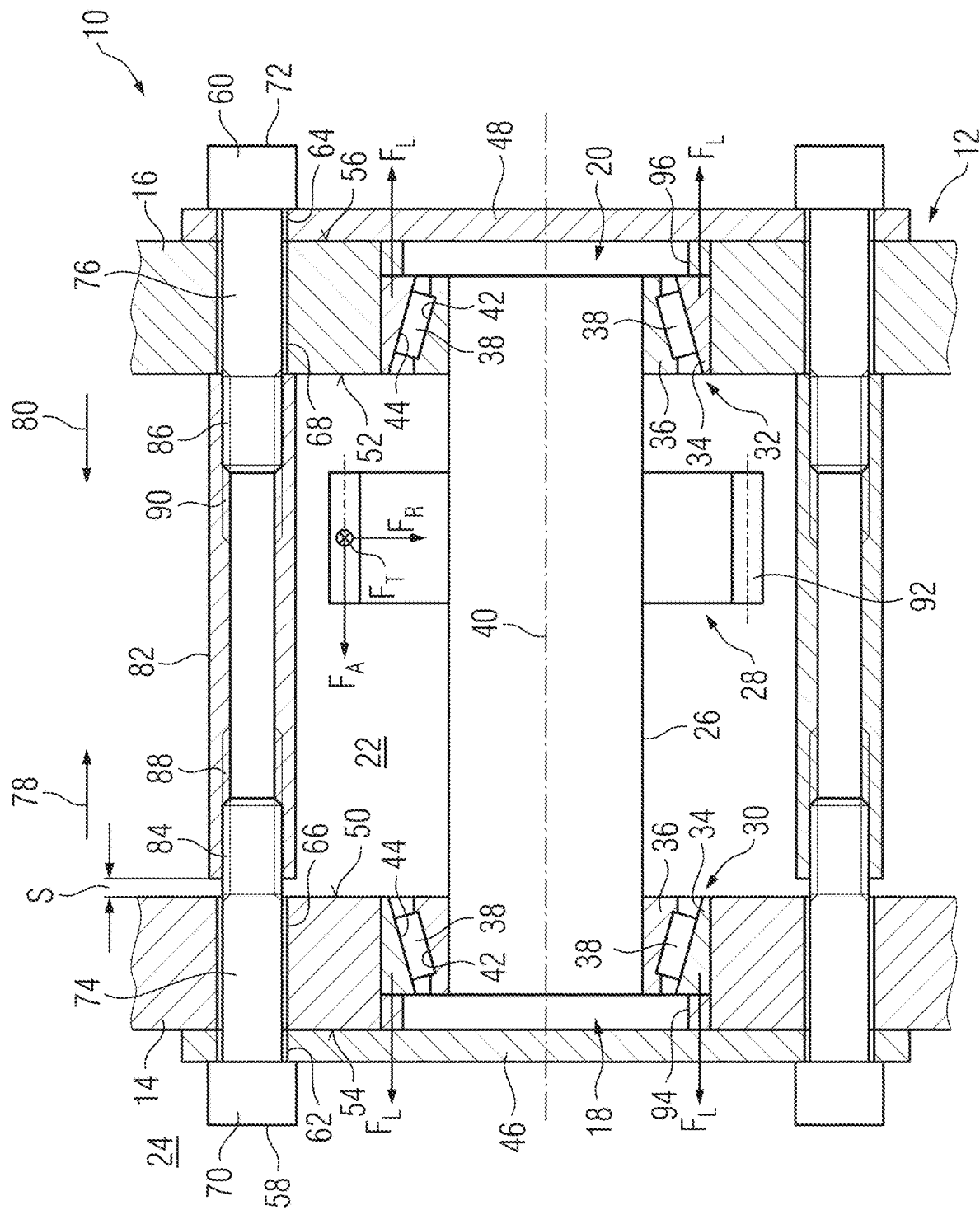

TRANSMISSION WITH PRETENSIONED TRANSMISSION HOUSING WALLS

This application claims the benefit of European Patent Application No. EP 19171926.9, filed on Apr. 30, 2019, which is hereby incorporated by reference in its entirety.

BACKGROUND

The present embodiments relate to a transmission.

Transmissions are already well known from the general prior art. Such a transmission is conventionally used for converting torque and/or rotational speed. For this purpose, the transmission conventionally has a shaft and a gear wheel that is connected to the shaft for rotation therewith and is accommodated in a transmission housing of the transmission. The transmission housing is also referred to as a housing. During operation of such a transmission, forces that are conventionally introduced via the gear wheel and the shaft into the transmission housing and/or into at least one bearing cover conventionally occur and are thereby supported. In order to avoid excessive loadings and therefore damage of the transmission, the transmission housing and the bearing cover are conventionally very solid and therefore weighty and costly.

An arrangement of the type defined at the beginning is already known from EP 2 821 658 A1.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a transmission, the weight and costs of which may be kept particularly low, is provided.

A transmission according to an embodiment has a transmission housing (e.g., a housing) that has a first wall and a second wall opposite the first wall. The respective wall is also referred to as a housing wall. A first opening of the transmission is formed in the first wall, and a second opening of the transmission is formed in the second wall. The first opening and the second opening (e.g., the openings) lie opposite each other. The respective opening is, for example, a passage opening that opens, for example, on one side into an interior space of the transmission (e.g., a receiving space or receiving region) and is at least partially (e.g., at least predominantly or completely) bounded by the transmission housing, and opens, on the other side, for example, to surroundings of the transmission housing or of the transmission.

The transmission also has at least one shaft that may be connected, for example, to at least one or precisely one gear wheel arranged in the transmission housing for rotation with the gear wheel. In one embodiment, the gear wheel and the shaft may be formed integrally with each other, or the shaft and the gear wheel are components of the transmission that are formed separately from each other and are connected to each other for rotation with each other. In one embodiment, the gear wheel is fixed to the shaft in the axial direction and in the radial direction of the shaft.

The transmission also includes a bearing device arranged in the first opening and a second bearing device arranged in the second opening. The shaft is mounted, for example, rotatably on the transmission housing via the first bearing device arranged in the first opening and via the second bearing device arranged in the second opening; therefore, the shaft and, with the shaft, the gear wheel are rotatable about an axis of rotation relative to the transmission housing. The axis of rotation coincides with, for example, the axial direction of the shaft and runs perpendicularly to the radial direction of the shaft. The walls and the openings may be opposite one another in the axial direction of the shaft. In one embodiment, the openings may be arranged in alignment with one another or coaxially with respect to one another. The walls may be formed integrally with one another, or the walls are formed by housing parts of the transmission housing that are formed separately from one another and are connected to one another at least indirectly (e.g., directly).

The transmission also includes a first cover that is also referred to as a first bearing cover or first housing cover. The first opening is covered, and therefore closed (e.g., toward the surroundings of the transmission housing), by the first cover. The transmission also includes a second cover that is also referred to as a second bearing cover or second housing cover. The second opening is covered by the second cover, and therefore closed, for example, toward the surroundings of the transmission housing. The first cover and the second cover (e.g., the covers) are formed, for example, separately from one another and separately from the housing and are held on the transmission housing.

The transmission also includes a first screw element, by which the first cover is held on the transmission housing. In addition, the transmission includes a second screw element, by which the second cover is held on the transmission housing. The first screw element is, for example, part of a first screw connection, by which the first cover is held (e.g., in a reversibly releasable manner) on the transmission housing. Alternatively or additionally, the second screw element is part of a second screw connection, by which the second cover is held (e.g., in a reversibly releasable manner) on the transmission housing. The respective screw element is configured, for example, as a screw.

The transmission also includes a coupling element that may be formed separately from the screw elements, separately from the covers, and separately from the transmission housing. The coupling element may be arranged (e.g., in the axial direction of the shaft), for example between, the walls and/or between the covers. In one embodiment, the screw elements are formed separately from the covers, separately from the transmission housing, separately from the shaft, and separately from one another. The screw elements are screwed, for example, to the coupling element in order to hold the covers on the transmission housing. As a result of this, the walls are pretensioned (e.g., mutually) in the axial direction of the shaft (e.g., are braced with respect to each other). The first screw element is supported on the first wall (e.g., on a side of the first wall facing away from the interior space) at least indirectly (e.g., directly; via a first screw head of the first screw element) in, for example, a first direction that coincides with the axial direction of the shaft or runs parallel to the axial direction of the shaft and points toward the second screw element. In one embodiment, the second screw element is supported on the second wall (e.g., on a second side of the second wall that faces away from the interior space) at least indirectly (e.g., directly; via a second screw head of the second screw element) in a second direction that coincides with the axial direction of the shaft or runs parallel to the axial direction of the shaft. The second direction is opposite the first direction and points toward the first screw element. For example, the first screw element and the second screw element (e.g., the screw elements) are screwed to the coupling element in the interior space or on a respective third side or fourth side of the respective wall. The respective third side or fourth side faces the interior space. As a result of this, the walls are braced with respect to each other in the axial direction of the shaft (e.g., are pretensioned). In other words, the walls are tensioned toward each other in the axial direction of the shaft by the screw elements and by the coupling element and are thereby pretensioned. Owing to the fact that the respective screw element is screwed to the coupling element, a bracing force acts on the respective wall from the respective screw element. The bracing force acts in the axial direction of the shaft and, in this case, in the direction of the respective other screw element. By this, the walls are pretensioned in the axial direction of the shaft. The screw elements are arranged coaxially with respect to one another or are aligned with one another.

The described pretensioning of the walls counteracts forces that occur, for example, during operation of the transmission and act, for example, in the axial direction of the shaft and are also referred to as operating forces, or the operating forces counteract the pretensioning. As a result of this, the pretensioning is, for example, at least partially (e.g., at least predominantly or completely) cancelled. As a result, the transmission may be operated at least virtually free of axial force at least with respect to the walls and the covers by the pretensioning of the walls. As a result, the transmission (e.g., the walls or the transmission housing and the covers) may be formed particularly delicately and therefore advantageously in terms of weight and costs, and therefore, the costs and the weight of the transmission according to the present embodiments may be kept within a particularly small framework. The shaft and, via the shaft, the gear wheel may be mounted on the transmission housing advantageously in terms of construction space and costs and weight by the bearing device. In addition, the bearing devices may be mounted particularly simply and therefore advantageously in terms of time and costs by, for example, the bearing devices being arranged in the openings from outside the transmission housing (e.g., from the surroundings), for example, in a state in which the covers are detached from the transmission housing and are therefore not yet held on the transmission housing.

In one embodiment, the coupling element at least in the unpretensioned state of the walls and, for example, also in the pretensioned state of the walls and in the axial direction of the shaft is shorter than a distance running in the axial direction between the walls and/or the covers (e.g., between the sides of the walls facing one another and facing the interior space or between sides of the covers facing one another in the axial direction of the shaft). This provides that, for example, in an unbraced or unpretensioned state of the walls (e.g., when the walls are not yet pretensioned by the screw elements, the coupling element (e.g., at least one end of the coupling element) is still spaced apart in the axial direction of the shaft from at least one of the walls or from at least one of the covers. The coupling element thereby permits the walls to be moved toward each other in the axial direction by screwing of the screw elements to the coupling element, and to thereby be pretensioned in the axial direction of the shaft since, for example, the walls or the covers cannot be supported on one another at least initially in the axial direction of the shaft via the coupling element. By this, for example, the pretensioning of the walls may be adjusted in a manner meeting requirements. As a result of this, operation of the transmission in a manner particularly low in axial force or even free of axial force may be realized, at least with respect to the walls. For example, the transmission housing and therefore the transmission overall may be configured to be particularly advantageous in terms of weight, construction space, and costs.

A further embodiment is distinguished in that the screw elements are screwed to the coupling element within the coupling element. For this purpose, the coupling element is configured, for example, as a tube, within which the screw elements are at least partially accommodated and are screwed to the coupling element. The coupling element configured, for example, as a screw has, for example, a respective external thread, where the coupling element has, for example, a respective internal thread corresponding to the respective external thread. In this case, for example, the respective screw element is screwed via an external thread and the corresponding internal thread to the coupling element. The weight and the costs of the transmission may thereby be kept particularly low.

According to the present embodiments, the coupling element is arranged (e.g., completely) outside the shaft and next to the shaft in the radial direction of the shaft. The walls may thereby be pretensioned particularly advantageously, and therefore, a particularly low-load operation of the transmission may be realized.

In order to be able to keep the number of parts and therefore the costs and the weight particularly low, it is provided, in a further refinement of the present embodiments, that the coupling element that is formed separately from the covers, separately from the transmission housing, and separately from the screw elements is formed integrally.

A further embodiment is distinguished in that the respective bearing device is supported on the transmission housing (e.g., directly) in the radial direction of the shaft, bypassing the covers. For example, the respective bearing device is supported (e.g., directly) on a respective inner circumferential lateral surface of the respective wall bounding the respective opening (e.g., directly) in the radial direction of the shaft bypassing the covers. The feature of the bearing device being supported on the transmission housing bypassing the covers may be that forces acting on the respective wall from the respective bearing device (e.g., in the radial direction) are transmitted to the respective wall from the respective bearing device and bypass the covers (e.g., do not flow via the covers or through the covers on their way from the respective bearing device to the respective wall). This makes it possible to keep the number of parts and therefore the weight, the requirement for construction space, and the costs particularly low.

In order to be able to realize a particularly low-load mounting of the shaft and, as a result, to be able to keep the costs and the weight of the transmission particularly low, it is provided, in a further refinement of the present embodiments, that the bearing devices are configured as rolling bearings (e.g., as tapered roller bearings) in an X arrangement.

A further embodiment is distinguished in that the gear wheel is configured as a spur gear. By this, the costs and the weight may be kept particularly low.

In a further advantageous refinement of the present embodiments, the respective bearing device is supported on the respective cover in the axial direction of the shaft by a respective supporting element that is formed separately from the respective bearing device and separately from the respective cover. A defined and low-load operation may thereby be realized, and therefore, the weight and the costs of the transmission may be kept particularly low.

In a further refinement, the gear wheel has a toothing that may be configured as a helical toothing.

The walls may be pretensioned with a pretensioning force that acts in the axial direction and corresponds to a sum of an axial force of the toothing that occurs during operation of the transmission and a difference of axial forces of the bearing devices that are induced during the operation. As a result, an operation of the transmission at least virtually free of axial force may be realized, at least with respect to the walls. This may provide, for example, that during the operation of the transmission, at least virtually no axial forces act on the walls; therefore, the transmission housing may be configured particularly delicately and therefore particularly advantageously in terms of costs and weight.

Further advantages, features, and details of the invention emerge from the description below of exemplary embodiments and with reference to the drawing. The features and combinations of features mentioned above in the description and the features and combinations of features mentioned below in the description of the FIGURE and/or shown in the FIGURE alone are usable not only in the respectively stated combination, but also in other combinations without departing from the scope of the invention.

BRIEF DESCRIPTION OF THE DRAWINGS

FIG. 1 shows part of a partially sectioned side view of an embodiment of a transmission.

DETAILED DESCRIPTION

In FIG. 1, same or functionally same elements are provided with the same reference signs.

FIG. 1 shows part of a schematic and partially sectioned side view of a transmission 10 that may be employed and therefore used, for example, in machines, plants, and/or other devices. For example, the transmission 10 is used for converting torque and/or rotational speed. The transmission 10 has a transmission housing 12 (e.g., a housing), part of which is shown in FIG. 1. FIG. 1 shows a first embodiment of the transmission 10. The transmission housing 12 has a first wall 14 and a second wall 16 opposite the first wall 14. The first wall 14 and the second wall 16 are also referred to as housing walls. The transmission 10 also has a first opening 18 that is formed in the first wall 14. A second opening 20 of the transmission 10 is formed in the second wall 16. FIG. 1 shows that the first opening 18 and the second opening 20 are configured as passage openings and therefore open (e.g., as viewed on their own) on one side into an interior space 22 of the transmission 10 (e.g., a receiving space or receiving region) that is at least partially (e.g., at least predominantly or completely) bounded by the transmission housing 12, and, on the other side, into or to surroundings 24 of the transmission housing 12 (e.g., of the transmission 10). Since the first wall 14 and the second wall 16 are opposite each other, and since the first opening 18 and the second opening 20 are formed in the first wall 14 and the second wall 16, respectively, the first opening 18 and the second opening 20 are also opposite each other. For example, the first opening 18 and the second opening 20 overlap or cover each other. For example, the first opening 18 and the second opening 20 may be arranged in alignment with each other and/or coaxially with respect to each other. The respective opening 18 or 20 is, for example, round (e.g., circular) on an inside circumference.

The transmission 10 also has at least one shaft 26 that is at least partially arranged in the interior space 22 and therefore in the transmission housing 12. In addition, the transmission 10 includes at least one gear wheel 28 that is configured, for example, as a spur gear and is connected to the shaft 26 for rotation therewith. The transmission 10 also includes a first bearing device 30 that is arranged at least partially (e.g., at least predominantly or completely) in the first opening 18. The transmission 10 also includes a second bearing device 32 that is arranged at least partially (e.g., at least predominantly or completely) in the second opening 20. In the first embodiment, the respective bearing device 30 or 32 is configured as a rolling bearing (e.g., a tapered roller bearing). The first bearing device 30 and the second bearing device 32 in the first embodiment are configured and arranged as tapered roller bearings in an X arrangement.

The respective bearing device 30 or 32 is formed separately from the transmission housing 12 and has an outer ring 34 that is formed separately from the transmission housing 12 and is also referred to as a bearing outer ring. In addition, the respective bearing device 30 or 32 includes an inner ring 36 that is also referred to as a bearing inner ring and is formed separately from the outer ring 34. In addition, the inner ring 36 is formed separately from the shaft 26. The respective bearing device 30 or 32 also includes rolling bodies 38 that are configured as, for example, rollers (e.g., tapered rollers). The shaft 26 is mounted rotatably on the first wall 14 and the second wall 16 and therefore on the transmission housing 12 via the first bearing device 30 and the second bearing device 32, and therefore the shaft 26. With the shaft 26, the gear wheel 28 is rotatable about an axis of rotation 40 relative to the transmission housing 12 and therefore relative to the first wall 14 and the second wall 16. The gear wheel 28 is mounted rotatably on the first wall 14 and the second wall 16 and therefore on the transmission housing 12 via the shaft 26 and via the first bearing device 30 and the second bearing device 32.

The respective inner ring 36 forms a respective first running track 42 for the rolling bodies 38, where the respective outer ring 34 forms a respective running track 44 for the rolling bodies 38. The inner ring 36 is, for example, connected to the shaft 26 so as to be rotatable therewith or to the shaft 26 for rotation therewith. The respective outer ring 34 is fixed (e.g., nonrotatably) on the respective wall 14 or 16, and, therefore, relative rotations, running about the axis of rotation 40, between the respective outer ring 34 and the respective wall 14 or 16 are absent. If the shaft 26 and, with the shaft 26, the inner rings 36 and the gear wheel 28 now rotate about the axis of rotation 40 relative to the first wall 14 and the second wall 16 and therefore relative to the outer rings 34, the rolling bodies 38 roll along running tracks 42 and 44. A low-friction and therefore low-loss mounting of the shaft 26 on the first wall 14 and the second wall 16 and therefore on the transmission housing 12 may thereby be provided.

The first wall 14 and the first opening 18 are assigned a first cover 46 (e.g., first bearing cover or first housing cover) that is formed separately from the first wall 14 and the second wall 16 and separately from the shaft 26. The first opening 18 is covered, and therefore closed (e.g., toward the surroundings 24), by the first cover 46. The first cover 46 is held (e.g., in a reversibly releasable manner) on the transmission housing 12 (e.g., on the first wall 14).

The second wall 16 and the second opening 20 are assigned a second cover 48 that is formed separately from the shaft 26 and separately from the first wall 14 and the second wall 16. The second opening 20 is covered, and therefore closed (e.g., toward the surroundings 24), by the second cover 48. The second cover 48 is held in, for example, a reversibly releasable manner on the second wall 16. FIG. 1 shows that the respective wall 14 or 16 has an inner side 50 or 52 that faces the interior space 22 and the respective other wall 16 or 14 in the axial direction of the shaft 26. In addition, the respective wall 14 or 16 has an outer side 54 or 56 that faces away from the respective inner side 50 or 52 and therefore away from the interior space 22 and the respective other wall 16 or 14 in the axial direction of the shaft 26. The outer side 54 of the first wall 14 is also referred to as the first side, and the outer side 56 of the second wall 16 is also referred to as the second side. The inner side 50 of the wall 14 is also referred to as the third side, the inner side 52 of the wall 16 is also referred to as the fourth side. The first cover 46 is arranged at the surroundings 24 and on the outer side 54, and is supported (e.g., directly) on the outer side 54 in the axial direction of the shaft 26. Accordingly, the second cover 48 is arranged at the surroundings 24 and therefore outside the transmission housing 12, where the second cover 48 is arranged on the outer side 56 and is supported at least indirectly (e.g., directly) on the outer side 56 in the axial direction of the shaft 26. In addition, FIG. 1 shows that the first wall 14 and the second wall 16 and therefore the first opening 18 and the second opening 20 are opposite one another in the axial direction of the shaft 26.

The first cover 46 is assigned a first screw element 58, by which the first cover 46 is held (e.g., in a reversibly releasable manner) on the first wall 14. The first cover 46 is held in an at least indirect (e.g., direct) supporting contact with the outer side 54 along the axial direction of the shaft 26 by the first screw element 58. The second cover 48 is assigned a second screw element 60, by which the second cover 48 is held (e.g., in a reversibly releasable manner) on the second wall 16. The second cover 48 is held in an at least indirect (e.g., direct) supporting contact with the outer side 56 in the axial direction of the shaft 26 by the second screw element 60. The respective cover 46 or 48 has a passage opening 62 or 64, through which the respective screw element 58 or 60 is inserted. In other words, the respective screw element 58 or 60 penetrates the respective passage opening 62 or 64. The respective passage opening 62 or 64 may be arranged free of a thread, and therefore, no thread is arranged in the respective passage opening 62 or 64.

In addition, the wall 14 has a passage opening 66 that may be free of a thread. Accordingly, the wall 16 has a passage opening 68 that may be free of a thread. The first screw element 58 penetrates the passage opening 66, and the second screw element 60 penetrates the passage opening 68. FIG. 1 shows that the first screw element 58 and the second screw element 60 are in each case partially accommodated in the surroundings 24, partially in the interior space 22, partially in the passage opening 66 or 68, and therefore in the respective wall 14 or 16 and partially in the respective passage opening 62 or 64, and therefore partially in the respective cover 46 or 48.

The respective screw element 58 or 60 is configured as a screw that has a respective screw head 70 or 72 and a respective screw shaft 74 or 76. The screw head 70 or 72 may be connected to the screw shaft 74 or 76 (e.g., formed integrally therewith). The respective screw head 70 or 72 has a larger outside circumference (e.g., a larger outside diameter) than the respective screw shaft 74 or 76. The first screw element 58 is supported at least indirectly (e.g., directly) on the first cover 46 and, via the first cover 46, on the first wall 14 (e.g., on the outer side 54) in a first direction that coincides with the axial direction of the shaft 26 or runs parallel to the axial direction, and is illustrated in FIG. 1 by an arrow 78. The first direction faces the second wall 16, runs in the direction of the second wall 16, or points toward the second wall 16. In a corresponding manner, the screw element 60 is supported via its screw head 72 at least indirectly (e.g., directly) on the second cover 48 and, via the second cover 48, on the second wall 16 (e.g., on the outer side 56) in a second direction that is opposite the first direction. The second direction is illustrated in FIG. 1 by an arrow 80 and coincides with the axial direction of the shaft 26 or runs parallel to the shaft 26. The second direction runs, for example, in the direction of the first wall 14, or the second direction points toward the first wall 14 or in the direction of the first wall 14. The screw elements 58 and 60 are arranged, for example, coaxially with respect to each other.

In order to be able to realize a particularly low-load operation of the transmission 10, at least with respect to the first wall 14 and the second wall 16, and, as a result, to be able to design the transmission housing 12 to be particularly delicate and therefore advantageous in terms of weight and costs, the transmission 10 has at least one coupling element 82 that is shared by the first screw element 58 and the second screw element 60 and is arranged between the first wall 14 and the second wall 16 (e.g., between the inner sides 50 and 52) in the axial direction of the shaft 26. In order to hold the first cover 46 and the second cover 48 on the first wall 14 and the second wall 16 and therefore on the transmission housing 12, screw elements 58 and 60 are screwed to the coupling element 72 (e.g., bypassing the first wall 14 and the second wall 16 and the first cover 46 and the second cover 48). This provides that the first screw element 58 and the second screw element 60 are not screwed to the first cover 46 and the second cover 48 and are not screwed to the first wall 14 and the second wall 18, but rather, the first screw element 58 and the second screw element 60 are each screwed to the coupling element 82. The first walls 14 and the second wall 16 are thereby braced with respect to each other, and therefore pretensioned in the axial direction of the shaft 26. In the first embodiment shown in FIG. 1, the coupling element 82 is configured as a tube within which the first screw element 58 and the second screw element 60 are screwed to the coupling element 82.

The first screw element 58 (e.g., the screw shaft 74) has, for example, a first thread in the form of a first external thread 84. The second screw element 60 (e.g., the screw shaft 76) has, for example, a second thread (e.g., a second external thread 86). The coupling element 82 has, for example, a third thread in the form of a first internal thread 88 corresponding to the external thread 84, where the first screw element 58 is screwed via the external thread 84 and the internal thread 88 to the coupling element 82 and is screwed into the coupling element 82. Again, expressed in other words, the first screw element 58 or the external thread 84 is screwed into the corresponding internal thread 88 and therefore into the coupling element 82. As a result of this, the first screw element 58 is screwed to the coupling element 82.

The coupling element 82 also has, for example, a fourth thread in the form of a second internal thread 90 corresponding to the external thread 86, where the second screw element 60 is screwed via the external thread 86 and the internal thread 90 to the coupling element 82. In other words, the external thread 86 is screwed into the corresponding internal thread 90. As a result of this, the second screw element 60 is screwed into the coupling element 82 and therefore is screwed to the coupling element 82.

FIG. 1 shows that the coupling element 82, at least in an unpretensioned state of the first wall 14 and the second wall 16 (e.g., in a state in which the first wall 14 and the second wall 16 are not pretensioned by the first screw element 58 and the second screw element 60), is shorter in the axial direction of the shaft 26 than a distance running in the axial direction of the shaft 26 between the first wall 14 and the second wall 16 (e.g., between the inner sides 50 and 52). Therefore, at least in the unpretensioned state, a gap S is provided in the axial direction of the shaft 26 between the coupling element 82 and, for example, the inner side 50. If, starting from the unpretensioned state, the first screw element 58 and the second screw element 60 are screwed to the coupling element 82. As a result of this, the first wall 14 and the second wall 16 are pretensioned. This results, for example, in the gap S being at least reduced in size or even eliminated. The pretensioning of the first wall 14 and the second wall 16 causes the first wall 14 and the second wall 16 to be moved a distance toward each other (e.g., in the axial direction of the shaft 26) and to thereby be pretensioned. This is permitted by the coupling element 82 since the length thereof running in the axial direction of the shaft 26 is smaller than the distance running in the axial direction between the inner sides 50 and 52, at least in the unpretensioned state. Even in the pretensioned state of the first wall 14 and the second wall 16, the coupling element 82 may still be shorter in the axial direction of the shaft 26 than the distance between the inner sides 50 and 52; therefore, even in the pretensioned state of the walls 14 and 16, a second gap is provided in the axial direction of the shaft 26 between the coupling element 82 and, for example, the inner side 50. The second gap is, for example, smaller than the first gap.

The gear wheel 28 is configured, for example, as a spur gear. The gear wheel 28 has, for example, a toothing 92 that is configured, for example, as a helical toothing. At least during operation of the transmission 10, the gear wheel 28 meshes via toothing 92 with a corresponding further gear wheel, not illustrated in FIG. 1 (e.g., the transmission 10). This results in meshing forces $F_A$, $F_T$ and $F_R$ of the toothing 92 that are illustrated in particularly schematic form in FIG. 1. In other words, during the operation, the meshing forces $F_A$, $F_T$ and $F_R$ occur at the toothing 92. The meshing force $F_A$ is an axial force since the meshing force $F_A$ acts in the axial direction of the shaft 26.

In addition, bearing forces of the respective bearing device 30 or 32 that act in the axial direction of the shaft 26 are denoted by $F_L$ in FIG. 1. The respective bearing force $F_L$ is also an axial force that acts in the axial direction of the shaft 26. The bearing forces $F_L$ are, for example, induced bearing axial forces that act on the respective cover 46 or 48 from the respective bearing device 30 or 32. For this purpose, the respective bearing device 30 or 32 is supported on the respective cover 46 or 48 via a respective supporting element 94 or 96 formed separately from the respective bearing device 30 or 32 and separately from the covers 46 and 48 in the axial direction of the shaft 26. This provides that the respective supporting element 94 or 96, which is configured, for example, as a ring is arranged between the respective bearing device 30 or 32 and via the respective cover 46 or 48 in the axial direction of the shaft 26.

At least one pretensioning force acting in the axial direction of the shaft 26 and by which the first wall 14 and the second wall 16 are braced with respect to each other and are therefore pretensioned in the axial direction of the shaft 26 is brought about by the first screw element 58 and the second screw element 60 and by the coupling element 82. The meshing force $F_A$ and the respective bearing force $F_L$ are axial forces that are also referred to as operating forces or axial operating forces. The operating forces occur during the operation of the transmission 10. The pretensioning force and therefore the pretensioning of the first wall 14 and the second wall 16 may be adjusted such that the pretensioning force and therefore the pretensioning counteract the operating forces, or vice versa (e.g., such that the pretensioning is at least partially, at least predominantly or completely, eliminated by the operating forces). By this, the first wall 14 and the second 16 and/or the first cover 46 and the second cover 48 are at least virtually free of axial force during the operation; therefore, a particularly low-load operation of the transmission 10 may be realized, at least with respect to the first wall 14 and the second wall 16 and/or the first cover 46 and the second cover 48. As a result, the transmission 10 may be formed particularly delicately and therefore advantageously in terms of costs and weight.

The transmission 10 and, for example, the refinement thereof are based, for example, on the findings that shafts in spur gear transmissions may be mounted in an X arrangement (e.g., using tapered roller bearings). Since, for example, the gear wheel 28 is configured as a spur gear, the transmission 10 is configured, for example, as a spur gear transmission. A mounting of a shaft, for example, of a spur gear transmission using tapered roller bearings in an X arrangement may conventionally lead to not inconsiderable axial forces. Conventionally, the axial forces are generally introduced into the housing via the bearing covers, which are screwed into or on the housing walls. As a result, a load that acts on the housing and may lead to an axial deformation and high stressing of the housing occurs. This deformation of the housing may influence the load-bearing behavior of the spur gear stages. As a result, it is conventionally provided for the housing and/or the covers to be of solid design in order to avoid excessive stresses and deformations.

The previously mentioned problems and disadvantages may now be avoided in the case of the transmission 10. The first cover 46 and the second cover 48 are not screwed in the first wall 14 and the second wall 16 (e.g., housing walls), but rather in the coupling element 82 that is configured, for example, as a tube and lies or is arranged between the housing walls. The coupling element 82 is configured to be slightly shorter than the distance between the housing walls. The first wall 14 and the second wall 16 may thereby be pretensioned axially. This design leads to an elimination of the bearing forces induced by the first bearing device 30 and the second bearing device 32. The pretensioning of the housing walls may be realized at the level of the resulting axial meshing force $F_A$ and a difference of the induced axial bearing forces.

In the first embodiment shown in FIG. 1, the coupling element 82 is arranged completely outside the shaft 26 and next to the shaft 26 in the radial direction of the shaft 26. The shaft 26 may be configured, for example, as a solid shaft.

In addition, the respective bearing device 30 or 32 is supported on the transmission housing 12 (e.g., on the respective wall 14 or 16, directly, in the radial direction of the shaft 26 bypassing the first cover 46 and the second cover 48). For this purpose, the first bearing device 30 (e.g., the outer ring 34 of the first bearing device 30) is supported toward the outside on the wall 14. For example, the first bearing device 30 is supported on an inside circumferential lateral surface 104 of the wall 14 (e.g., directly) in the radial direction of the shaft 26, where the inside circumferential lateral surface 104 forms or bounds the opening 18 (e.g., in a completely encircling manner; directly). In addition, the second bearing device 32 (e.g., the outer ring 34 of the bearing device 32) is supported toward the outside on the second wall 16. For example, the second bearing device 32 is supported on an inside circumferential lateral surface 106 of the wall 16 (e.g., directly) in the radial direction of the shaft 26, where the inside circumferential lateral surface 106 forms or bounds the opening 20 (e.g., in a completely encircling manner; directly).

The pretensioning of the walls 14 and 16 enables the transmission 10 to be operated at least virtually free of axial force (e.g., at least with respect to the first wall 14 and the second wall 16). By this, an excessive stressing and deformation of the transmission housing 12 may be avoided. In comparison to conventional solutions, the load-bearing behavior of the toothing 92 is therefore less effected by a flexibility of the transmission housing 12. As a result, the transmission housing 12 may be formed particularly delicately and therefore advantageously in terms of weight and costs.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A transmission comprising:
   a transmission housing that has a first opening formed in a first wall of the transmission housing and a second opening that is formed in a second wall of the transmission housing, the second wall being opposite the first wall and the second opening being opposite the first opening;
   at least one shaft that is mounted rotatably on the transmission housing via a first bearing device arranged in the first opening and via a second bearing device arranged in the second opening;
   a first cover, by which the first opening is closed;
   a second cover, by which the second opening is closed;
   a first screw element, by which the first cover is held on the transmission housing;
   a second screw element, by which the second cover is held on the transmission housing; and
   a coupling element, to which the first screw element and the second screw element are screwed, such that the first cover and the second cover are held on the transmission housing,
   wherein the first wall and the second wall are pretensioned in an axial direction of the at least one shaft as a result of the first screw element and the second screw element being screwed to the coupling element, such that the first cover and the second cover are held on the transmission housing,
   wherein the coupling element is arranged outside the at least one shaft and next to the at least one shaft in a radial direction of the at least one shaft, and
   wherein the coupling element is arranged completely outside the at least one shaft.

2. The transmission of claim 1, wherein the coupling element, at least in an unpretensioned state of the first wall and the second wall and in the axial direction of the at least one shaft, is shorter than a distance running in the axial direction between the first wall and the second wall, the first cover and the second cover, or the first wall and the second wall and the first cover and the second cover.

3. The transmission of claim 1, wherein the first screw element and the second screw element are screwed to the coupling element within the coupling element.

4. The transmission of claim 1, wherein the coupling element is formed integrally.

5. The transmission of claim 1, wherein the first bearing device and the second bearing device are supported on the transmission housing in the radial direction of the at least one shaft by passing the first cover and the second cover, respectively.

6. The transmission of claim 5, wherein the first bearing device and the second bearing device are supported directly on the transmission housing.

7. The transmission of claim 1, wherein the first bearing device and the second bearing device are configured as rolling bearings in an X arrangement.

8. The transmission of claim 7, wherein the rolling bearings are tapered roller bearings.

9. The transmission of claim 1, further comprising at least one gear wheel configured as a spur gear, the at least one gear being connected to the at least one shaft for rotation with the at least one shaft.

10. The transmission of claim 9, wherein a toothing of the at least one gear wheel is configured as a helical toothing.

11. The transmission of claim 9, wherein the first wall and the second wall are pretensioned by a pretensioning force that acts in the axial direction of the at least one shaft and corresponds to a sum of an axial force of a toothing that occurs during operation of the transmission and a difference of axial forces of the first bearing device and the second bearing device that are induced during the operation.

12. The transmission of claim 1, wherein the first bearing device and the second bearing device are supported on the first cover and the second cover, respectively, in the axial direction of the at least one shaft by respective supporting elements formed separately from the first bearing device and the second bearing device and separately from the first cover and the second cover.

13. A transmission comprising:
   a transmission housing that has a first opening formed in a first wall of the transmission housing and a second opening that is formed in a second wall of the transmission housing, the second wall being opposite the first wall and the second opening being opposite the first opening;
   at least one shaft that is mounted rotatably on the transmission housing via a first bearing device arranged in the first opening and via a second bearing device arranged in the second opening;
   a first cover, by which the first opening is closed;
   a second cover, by which the second opening is closed;
   a first screw element, by which the first cover is held on the transmission housing;
   a second screw element, by which the second cover is held on the transmission housing; and
   a coupling element, to which the first screw element and the second screw element are screwed, such that the first cover and the second cover are held on the transmission housing, wherein the first wall and the second wall are pretensioned in an axial direction of the at least one shaft as a result of the first screw element and the second screw element being screwed to the coupling element, such that the first cover and the second cover are held on the transmission housing, wherein the coupling element is arranged outside the at least one shaft and next to the at least one shaft in a radial direction of the at least one shaft, and wherein the coupling element, at least in an unpretensioned state of the first wall and the second wall and in the axial direction of the at least one shaft, is shorter than a distance running in the axial direction between the first wall and the second wall, the first cover and the second cover, or the first wall and the second wall and the first cover and the second cover.

\* \* \* \* \*